United States Patent [19]

Masuda et al.

[11] Patent Number: 4,595,973
[45] Date of Patent: Jun. 17, 1986

[54] SWITCHING POWER SUPPLY

[75] Inventors: Youichi Masuda, Yokohama; Toshihiro Onodera, Tokyo, both of Japan

[73] Assignee: Kabushiki Kaisha Toshiba, Kawasaki, Japan

[21] Appl. No.: 712,098

[22] Filed: Mar. 15, 1985

[30] Foreign Application Priority Data

Mar. 19, 1984 [JP] Japan .................................. 59-52807

[51] Int. Cl.$^4$ ........................................... H02M 3/335
[52] U.S. Cl. ........................................ 363/18; 363/75
[58] Field of Search ................. 363/18, 19, 75, 131; 331/112

[56] References Cited

U.S. PATENT DOCUMENTS 3,697,851 10/1972 Mast ...................................... 363/19
4,318,164 3/1982 Onodera et al. ...................... 363/21

FOREIGN PATENT DOCUMENTS 0775719 10/1980 U.S.S.R. ............................... 363/19

OTHER PUBLICATIONS

Kohno et al., "A Saturable Reactor Controlled Ringing Choke Converter", INTELEC 1979, Wash., D.C., USA, (Nov. 26-29 1979), pp. 265-271.
PESC '82 Record (IEEE 82CH-1762-4) pp. 27-32 "On the High-Speed Switching of the Free-Run DC-to-DC Converter With a Saturating Core"; K. Harada et al., Jun. 14-17, 1982.

Primary Examiner—Peter S. Wong
Attorney, Agent, or Firm—Oblon, Fisher, Spivak, McClelland & Maier

[57] ABSTRACT

A switching power supply has a saturable transformer provided with first to fourth windings. The first winding is inserted in series in a first path from a DC power source to a primary winding of a power transmitting transformer. A main switch is inserted in series in the first path and controlled by an output of the second winding. The operation of the main switch is positively fed back through the saturable transformer. A capacitor is connected in parallel to a series circuit consisting of the main switch and the first winding. An auxiliary source for generating a predetermined direct current output is provided to drive the third winding by a polarity opposite to that of the first winding. An auxiliary switch is inserted in series in a second path from the auxiliary source to the third winding and controlled by an output of the fourth winding. The operation of the auxiliary switch is positively fed back through the saturable transformer.

8 Claims, 13 Drawing Figures

SWITCHING POWER SUPPLY

BACKGROUND OF THE INVENTION

The present invention relates to a switching power supply of the voltage resonance type and, more particularly, to an apparatus which performs the switching operation due to self-oscillation.

Switching power supplies have such features as being small in size, light-weight and have high efficiency therefore, they are widely used as power sources for a number of electronic apparatuses such as electronic apparatuses for use in industry, electronic appartuses for use at home or the like.

One such kind of switching power supply is a voltage resonance type apparatus disclosed in U.S. Pat. No. 4,318,164. When considering a case where a self-oscillation system is applied to such a voltage resonance type switching power supply, in general, a blocking oscillator is applied and the power supply is constituted in a manner as shown in FIG. 1.

Practically speaking, a primary winding $1a$ of a power transmitting transformer 1 is connected to an input DC power source 3 in series through the collector-emitter of a transistor 2 serving as a switching element. A parallel circuit consisting of a resonance capacitor 4 and a damper diode 5 is connected between the collector-emitter of the transistor 2. A time constant circuit consisting of a series circuit of a resistor 6 and a capacitor 7 is connected in parallel to the power source 3. The connecting point of the resistor 6 and capacitor 7 of the time constant circuit is connected to a base of the transistor 2 through a tertiary winding $1c$ of the transformer 1. The transistor 2 is controlled by a control signal which is applied to this base. A predetermined AC voltage is developed in a secondary winding $1b$ of the transformer 1 due to the self-oscillating action which is caused by the operation of the transistor 2 being positively fed back through the tertiary winding $1c$ and the voltage resonance action by the capacitor 4 in the switching operation, due to this self-oscillation. The voltage developed in the secondary winding $1b$ of the transformer 1 is outputted as the DC voltage through a rectifying/smoothing circuit consisting of a diode 8 and a capacitor 9.

The fundamental operation of this apparatus is that the voltage of the primary winding $1a$ of the transformer 1 becomes a waveform as shown in FIG. 2A, the voltage between the collector-emitter of the transistor 2 becomes a waveform as shown in FIG. 2B, and the collector current of the transistor 2 becomes a waveform as shown in FIG. 2C.

However, it is ideal that the voltage resonance switching section, which is constituted by the portions of the winding $1a$, resistor 6 and capacitor 7 excluded from FIG. 1, operates to provide the waveforms as shown by broken lines in FIGS. 2A to 2C.

Namely, in such an arrangement, where it is intended to cause voltage resonance while allowing the self-oscillation to be performed, a certain time difference is needed in principle between the time when the transistor 2 is turned on and the time when the voltage of the primary winding $1a$ of the transformer 1 is inverted. A predetermined time is necessary until the voltage between the emitter-collector of the transistor 2 becomes zero after the terminal voltage of the primary winding $1a$ of the transformer 1 was inverted. If the transistor 2 is turned on within this interval, the resonance capacitor 4 is short-circuited by the transistor 2, and the charges stored in the capacitor 4 are discharged through the transistor 2. In the arrangement shown in FIG. 1, since the terminal voltage of the tertiary winding $1c$ of the transformer 1 is inverted instantaneously when the terminal voltage of the primary winding $1a$ of the transformer 1 is inverted, it is impossible to provide the foregoing proper time difference. Thus, a remarkable increase in electric power loss cannot be avoided in the arrangement shown in FIG. 1.

As described above, in the switching power supply which transmits power with high efficiency due to the switching operation using the voltage resonance, it is very difficult to control the switching operation of the main switching element by way of the self-oscillation while maintaining the voltage resonance condition.

SUMMARY OF THE INVENTION

It is an object of the present invention to provide a switching power supply which can realize the switching operation of the voltage resonance type due to the self-oscillating system by a relatively simple arrangement.

A switching power supply according to the present invention has a saturable transformer provided with its first to fourth windings, the first winding of which is inserted in series in a first power supply path from a DC power source to a primary winding of a power transmitting transformer. A main switching element is inserted in series in the first power supply path. The main switching element is controlled by the output of a second winding of the saturable transformer, thereby switching a first power supplying circuit. The operation of the main switching element is positively fed back by the saturable transformer through the first and second windings. A resonance capacitor is connected in parallel to a series circuit consisting of the main switching element and first winding or in parallel to the primary winding of the power transmitting transformer. The resonance capacitor causes resonance between this capacitor and the exciting inductance of the power transmitting transformer. An auxiliary power supply to generate a predetermined DC output, is provided to drive the third winding of the saturable transformer by the polarity opposite to that of the first winding. An auxiliary switching element is inserted in series in a second power supply path from the auxiliary power supply to the third winding of the saturable transformer. This auxiliary switching element is controlled by an output of the fourth winding of the saturable transformer, thereby switching the second power supply path. the operation of the auxiliary switching element is positively fed back by the saturable transformer through the third and fourth windings.

In the switching power supply of the invention, the main switching element is turned off due to the saturation of the saturable transformer and is turned on due to the inverting operation of the saturable transformer due to the current saturation of the auxiliary switching element. Therefore, the self-oscillating condition to drive the main switching element can be set irrespective of the voltage resonance condition which is determined due to the resonance capacitor and the exciting inductance of the power transmitting transformer. Namely, the main switching element can be driven due to the self-oscillation while maintaining the voltage resonance condition, so that the self-oscillating condition can be easily set and the self-oscillating drive of the main switching element can be realized without making the arrangement complicated. In addition, since this power supply is of the voltage resonance type, the current and voltage waveforms of the circuit become the resonance waveforms, thereby reducing the occurrence of harmonic noise. Further, since the main switching element is turned on when the voltage applied to the switching section is zero, so that switching loss upon turning-on the main switching element is not caused. On the other hand, a change in voltage across the switching section when the main switching element is turned off is gentle and the loss at the time of the turning-off is small.

DETAILED DESCRIPTION OF THE PREFERRED EMBODIMENTS

Figure 1:
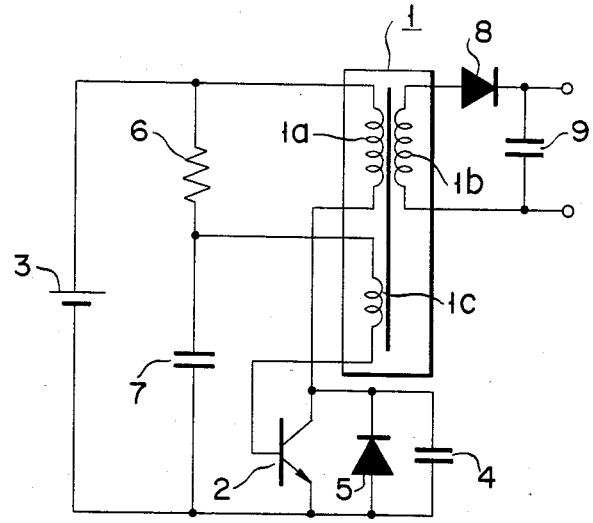
FIG. 1 is a circuit arrangement diagram showing an example of an arrangement in which the self-oscillating system is applied to a switching power supply of the voltage resonance type due to conventional technology.
Figure 2A:
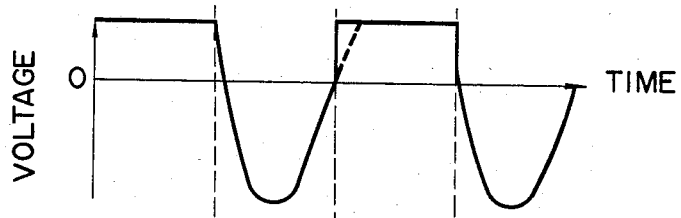
FIGS. 2A to 2C are waveform diagrams in the respective sections for explaining the operation in the apparatus shown in FIG. 1.
Figure 2B:
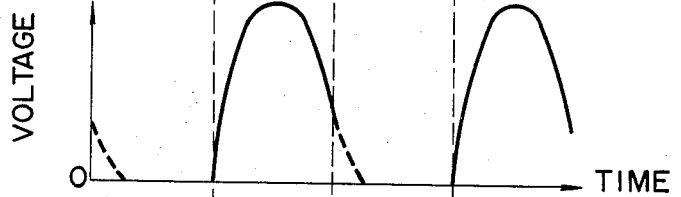
Figure 2C:
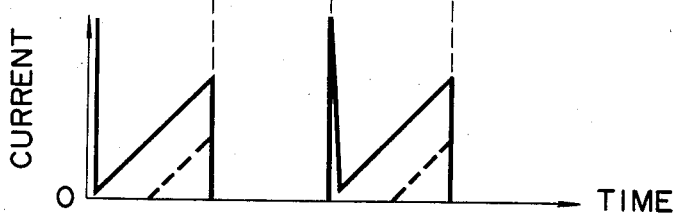
Figure 3:
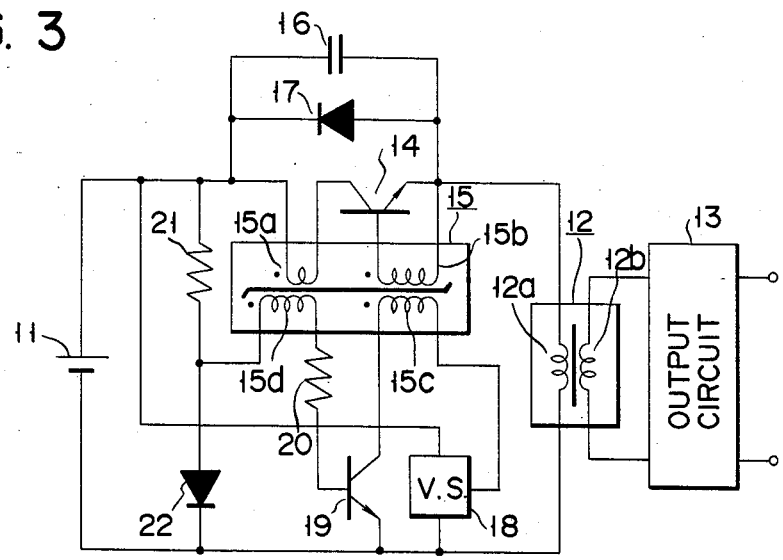
FIG. 3 is a circuit arrangement diagram showing an arrangement of a switching power supply in the first embodiment according to the present invention.

A switching power supply according to the first embodiment of the present invention is constituted as shown in FIG. 3.

This switching power supply has a DC power source 11, power transmitting transformer 12 and an output circuit 13. The power transmitting transformer 12 has a primary winding 12a and a secondary winding 12b. The output circuit 13 connected to the secondary winding 12b of the power transmitting transformer 12 includes a rectifying and smoothing circuit to rectify an output on the secondary side of the transformer 12 and thereby obtain a direct current.

A first non-type transistor 14 is used as a main switching element. A collector of the first transistor 14 is connected to a positive polarity of the DC power source 11 through a first winding 15a of a saturable transformer 15. An emitter of the first transistor 14 is connected to a negative polarity of the power source 11 through the primary winding of the power transmitting transformer 12. The saturable transformer 15 has first to fourth windings 15a to 15d. The second winding 15b of the saturable transformer 15 is connected between a base and the emitter of the first transistor 14. A main current, i.e., a collector current of the transistor 14 is detected by the first winding 15a of the saturable transformer 15 and is positively fed back to the base of the transistor 14 through the second winding 15b. A resonance capacitor 16, which causes the voltage resonance action between this capacitor and the exciting inductance of the power transmitting transformer 12, and a damper diode 17 which recovers the electric power are connected in parallel to a series circuit consisting of the first winding 15a and the collector-emitter circuit of the first transistor 14.

An auxiliary power supplying circuit 18 is provided to generate a predetermined DC voltage using the DC power source 11 as a power source.

A second npn-type transistor 19 is used as an auxiliary switching element. A collector of the second transistor 19 is connected to the auxiliary power source 18 through the third winding 15c of the saturable transformer 15. A connection of the auxiliary power source 18 to the third winding 15c is performed in a manner such that the direction of magnetic flux which is produced in the saturable transformer 15 when the third winding 15c is energized by the auxiliary power source 18 is opposite to the direction of magnetic flux which is produced when the first winding 15a is energized by the DC power source 11. An emitter of the second transistor 19 is connected to the negative polarity of the DC power source 11, namely, to a negative polarity of the auxiliary power source 18. A base of the second transistor 19 is connected to one end of the fourth winding 15d of the saturable transformer 15 through a resistor 20. A series circuit consisting of a resistor 21 and a diode 22 is connected between the positive and negative polarities of the DC power source 11. The other end of the fourth winding 15d of the saturable transformer 15 is connected to the connecting point of the resistor 21 and diode 22. The connecting polarity of the saturable transformer 15 to the fourth winding 15d is such that the collector current of the second transistor 19 is detected by the third winding 15c of the saturable transformer 15 and is positively fed back to the base of the transistor 19 through the fourth winding 15d.

In the embodiment, a switching period and a conduction width (on-period) of the transistor 14, a capacitance value of the capacitor 16, a value of the exciting inductance of the transformer 12, and the like are properly set such that the waveform of the voltage between the collector-emitter of the transistor 14 presents the resonance waveform. On the other hand, a saturation time of the saturable transformer 15 and turn ratios of the respective windings 15a to 15d, resistance values of the resistors 20 and 21, a voltage value of the auxiliary power source 18, and the like are appropriately set so as to cause the transistor 14 to perform the self-oscillating operation at a predetermined switching period and conducting width.

Figure 4A:
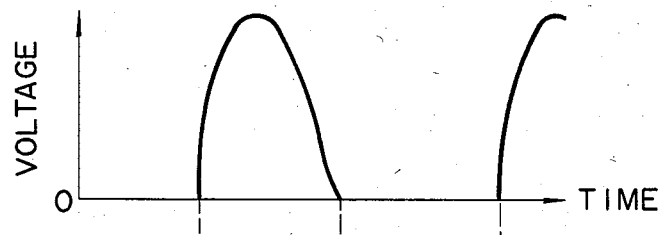
FIGS. 4A to 4C are waveform diagrams in the respective sections for explaining the operation in the apparatus shown in FIG. 3.
Figure 4B:
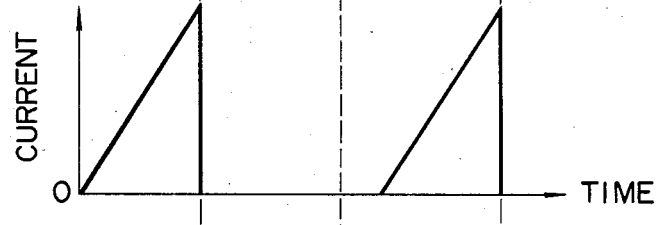
Figure 4C:
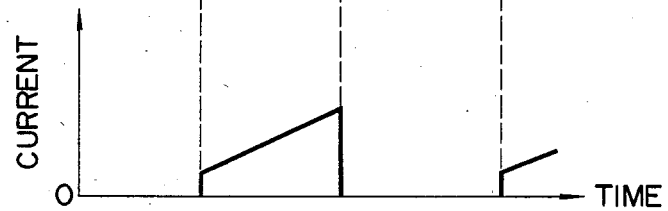

The waveforms in the respective sections in the operation of this switching power supply are shown in FIGS. 4A to 4C. FIG. 4A shows the waveform of the voltage between the collector-emitter of the first transistor 14. FIG. 4B shows the waveform of the collector current of the transistor 14. FIG. 4C shows the waveform of the collector current of the second transistor 19.

When the first transistor 14 is turned on, the second transistor 19 is in the off-state, so that a power voltage is applied from the DC power source 11 to the primary winding 12a of the power transmitting transformer 12 due to the conduction of the transistor 14.

The transformer 15 operates as what is called a current transformer for the interval from the time when the transistor 14 starts conducting until the saturable transformer 15 is saturated. When a current flows through the first winding 15a of the transformer 15, the current corresponding to the turn ratio of both windings flows through the second winding 15b and this current is supplied to the base of the transistor 14. This base current is positively fed back to the transistor 14, so that the transistor 14 maintains the conducting state due to this positive feedback action. This state is held until the transformer 15 is saturated. This interval, that is, the duration of the interval until the transformer 15 is saturated is inversely proportional to the saturation voltage between the base-emitter of the transistor 14 and is proportional to the number of turns of the second winding 15b.

When the transformer 15 is saturated, the base current is not supplied from the second winding 15b to the transistor 14 and also the impedance of the second winding 15b at this time is low enough, for the transistor 14 to rapidly turn off. At this time, the voltage on each winding of the transformer 15 is inverted, and a current flows through the fourth winding 15d due to the energy stored in the transformer 15. This current is supplied to the base of the transistor 19 through the resistor 20 and the transistor 19 starts conducting.

On the other hand, when the transistor 14 is turned off, the voltage between the collector-emitter of the transistor 14, namely, the voltage stored in the resonance capacitor 16 increases along an arc nearly like a sine wave and slowly decreases and returns to zero (0 V), mainly due to the resonance action of the capacitor 16 and transformer 12 (although it is also affected by the characteristic of the output circuit 13). Thereafter, the charging voltage to the capacitor 16 is apt to become negative. However, this charging voltage is maintained at the zero voltage (0 V) because of the conduction of the diode 17. The difference voltage between the power source voltage of the power source 11 and the voltage of the capacitor 16 is applied to the primary winding 12a of the power transmitting transformer 12. Namely, the terminal voltage of the primary winding 12a of the transformer 12 gradually drops from the voltage of the power source 11 and reaches the negative peak voltage. Thereafter, it increases again and passes through the zero voltage and reaches the voltage of the power source 11. When the terminal voltage of the primary winding 12a reaches the voltage of the power source 11, the diode 17 is made conductive and that voltage is held. When the current of the primary winding of the transformer 12 becomes zero, the diode 17 is made non-conductive.

When the first transistor 14 is turned off and the second transistor 19 is turned on, the saturable transformer 15 operates as what is called a voltage transformer, i.e., as an ordinary transformer. The voltage of the auxiliary power source 18 is applied to the third winding 15c due to the conduction of the transistor 19, so that the voltage correspoonding to the turn ratio of both windings is developed in the fourth winding 15d. At this time, the voltage responsive to the number of turns is also induced in the second winding 15b. However, this voltage becomes the reverse bias to the base-emitter of the transistor 14, so that the transistor 14 remains stably inconductive due to this reverse bias. The voltage generated in the fourth winding 15d allows the constant base current to be supplied to the transistor 19 through the resistor 20 and diode 22. At this time, since a large forward bias is applied through the resistor 21 to the diode 22 by the power source 11, the diode 22 is not turned off by a reverse current because it supplies the base current to the transistor 19.

The collector current of the transistor 19, which is made conductive by the foregoing base current, is supplied from the auxiliary power source 18 through the third winding 15c. Although this collector current gradually increases due to the inductance of the third winding 15c, when it reaches the current value which is determined by the base current of the transistor 19 and by its current amplification factor, the current will not flow above this current value. Due to this, the voltage of the third winding 15c is inverted and consequently the voltage of the fourth winding 15d is also inverted, so that the base current is not supplied to the transistor 19 and the transistor 19 is turned off.

The energy stored in the transformer 15 causes the current to flow through the second winding 15b due to the turning-off of the transistor 19. The current caused in the second winding 15b is suplied as the base current to the transistor 14 and the conduction of the transistor 14 is started by this base current. The timing when the transistor 14 starts conducting is instantaneously determined when the current is flowing through the diode 17 or when the above current is cut off. Therefore, when the conduction of the transistor 14 starts, the voltage between the collector-emitter is zero.

On one hand, the interval from the time when the transistor 14 is turned off until it is turned on, namely, the interval from the time when the transistor 19 is turned on until it is turned off is inversely proportional to the voltage of the auxiliary power source 18 and is proportional to the number of turns of the third winding 15c. Therefore, that interval can be set by properly setting that voltage and number of turns.

The above is the operation which is performed for one period of the switching. The switching on the primary side of the transformer 12 is executed by periodically and repeatedly performing that operation, so that the electric power is transmitted to the output circuit 13 through the transformer 12.

According to this switching power supply, the self-oscillation is effectively performed by the use of the saturation of the saturable transformer 15 and by the use of the inversion of the polarity of the saturable transformer 15 due to the saturation of the transistor 19, so that the voltage resonance is effectively caused, thereby enabling the electric power to be efficiently transmitted. Also, the self-oscillating and the voltage resonance operations do not have a bad influence due to the mutual interference. Thus, the voltage and current waveforms in the power transmitting section become the resonance waveforms and the occurrence of harmonic noise diminishes. Further, since the first transistor 14 serving as the main switching element is turned off at a high speed and the voltage across the switching section slowly increases, the switching loss at the time of turning-off also diminishes. On the other hand, when the transistor 14 is turned on, the voltage across the switching section is zero, so that no switching loss is caused. As will be obvious from the above description, even if the switching operation frequency is set to be high, the switching loss can be lessened to a level which can be ignored. Therefore, the switching power supply can be simply constituted in which the power transmitting efficiency is high and heat generation is little.

In addition, in this case, the voltage resonance is performed between the exciting inductance of the power transmitting transformer 12 and the resonance capacitor 16 connected in parallel to the series circuit consisting of the emitter-collector circuit of the first transistor 14 and the first winding 15a of the saturable transformer 15. This provide the following advantage.

To achieve such a voltage resonance, the resonance capacitor 16 may best be connected between the emitter and collector of the first transistor 14. If the capacitor 16 is so coupled, however, the excitation current accumulated in the primary winding 12a of the transformer 12 inevitably flows through the power source 11, first winding 15a and capacitor 16 when the transformer 15 is saturated and the first transistor 14 is turned off. As a result, the voltage on each winding of the transformer 15 cannot be reversed despite the fact that the transistor 14 has been turned off. Hence, no current flows through the fourth winding 15d, and the transistor 19 can no longer be turned off. Consequently, no reverse bias is applied on the base-emitter path of the transistor 14, and the transistor 14 cannot remain stably inconductive. The transistor 14 may be turned on again by the oscillating current generated by the parasitic capacitance and residual inductance between the base and emitter of the transistor 14. If the transistor 14 is turned on again, the resonance capacitor is discharged to generate noise.

To avoid such an undesirable phenomenon, the resonance capacitor 16 is not connected between the emitter and collector of the transistor 14 in the present embodiment. Since the excitation current of the transformer 12 does not flow through the first winding 15a, the transistor 14 is never be turned on immediately after it has been turned off.

Moreover, since voltage resonance is carried out between the exciting inductance of the transformer 12 and the resonance capacitor 16, there is no risk of resonance being caused between the parasitic capacitance of the transistor 14 and the exciting inductance of the power transmitting transformer 12 or an abnormal surge voltage developing and the transistor 14 being broken.

Figure 5A:
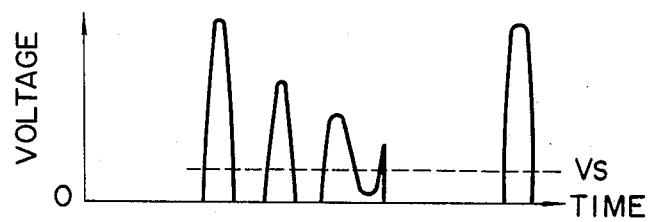
FIGS. 5A and 5B are waveform diagrams for explaining problems which are solved by the apparatus with the arrangement shown in FIG. 3.
Figure 5B:
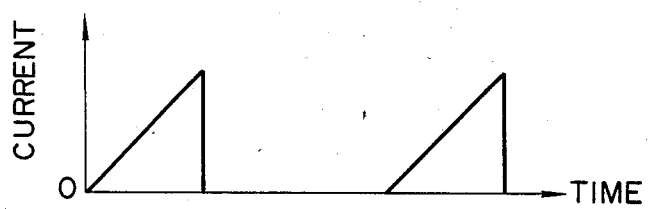

FIG. 5A shows the waveform of the voltage between the collector-emitter of the transistor 14 in the case where the resonance capacitor 16 was removed from the arrangement of FIG. 3, and FIG. 5B shows the waveform of the collector current, respectively.

That is, in the case where the parasitic capacitance of the transistor 14 is a halfway value for its operation frequency, an abnormal surge voltage as shown in FIG. 5A is caused due to the resonance action of the inductance of the transformer 12 and parasitic capacitance of the transistor 14. The peak value of the surge voltage reaches a value that is a few times to tens of times larger than a voltage Vs of the power source 11 and there is a risk that the transistor 14 will be broken due to this surge voltage. Particularly, in the case of adopting a rectifying circuit of the type whereby electric power is supplied to the load side for the interval when the transistor 14 is non-conducting as a rectifying circuit in the output circuit 13, a large problem is caused since the energy which is stored in the transformer 12 increases.

On the other hand, in the power supply of the embodiment, the resonance capacitor 16 is provided in parallel in the series circuit consisting of the emitter-collector circuit of the first transistor 14 serving as the main switching element and the first winding 15a of the saturable transformer 15. Therefore, even if a parasitic capacitance exists in the transistor 14, the current due to the energy stored in the transformer 12 flows through the resonance capacitor 16. Thus, the occurrence of the abnormal surge voltage can be suppressed and the voltage between the collector-emitter of the transistor 14 can be also preset. In addition, since the occurrence of the surge voltage is suppressed in this way, there is no risk of generating noise due to the surge.

As described above, since the resonance capacitor 16 is connected in parallel to the series circuit, consisting of the emitter-collector circuit of the first transistor 14 (serving as the main switching element) and the first winding 15a of the saturable transformer 15, there is also the advantage that the noise which is caused in the switching operation of the main switching element, namely, of the first transistor 14 can be easily absorbed by the resonance capacitor 16.

Further, the transistor 14 (the main switching element) is turned off due to the saturation of the saturable transformer 15 and the transistor 14 is turned on due to the inverting operation of the transformer 15 because of the current saturation of the transistor 19 serving as the auxiliary switching element. Consequently, the timing for the operation to turn the transistor 14 on or off can be set irrespective of the voltage resonance. This means that the operation timing for the self-oscillation can be set in accordance with the resonance waveform. Such a setting makes it possible to double the effects of the self-oscillation and voltage resonance.

The second to fourth embodiments according to the present invention will now be described.

Figure 6:
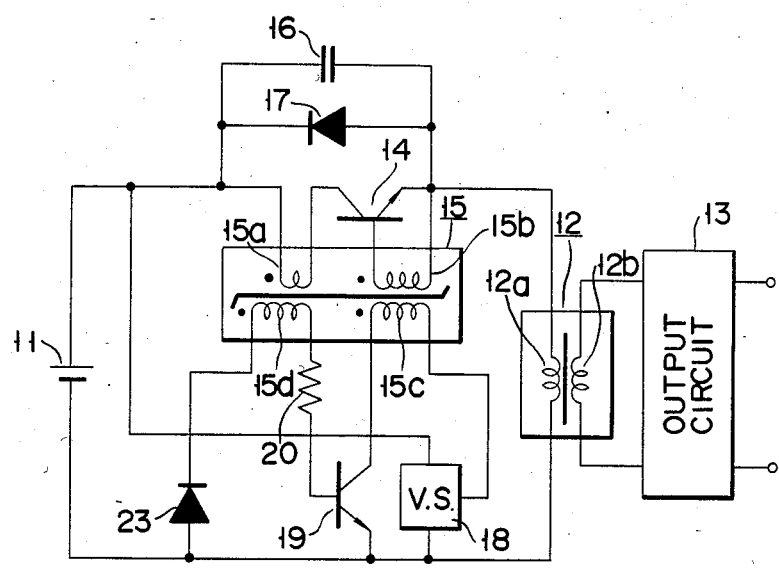
FIGS. 6 to 8 are circuit arrangement diagrams showing arrangements in the second to fourth embodiments according to the present invention, respectively.

FIG. 6 shows an arrangement of an apparatus in the second embodiment according to the invention.

In the apparatus in the second embodiment, the resistor 21 in FIG. 3 is removed and in place of the diode 22, a diode 23 of the opposite polarity is provided. Namely, in this apparatus, the base current supplying circuit of the second transistor 19 as the auxiliary switching element is not forwardly biased by the power source 11 but is biased only by the voltage which is developed by the third winding 15c of the saturable transformer 15.

Figure 7:
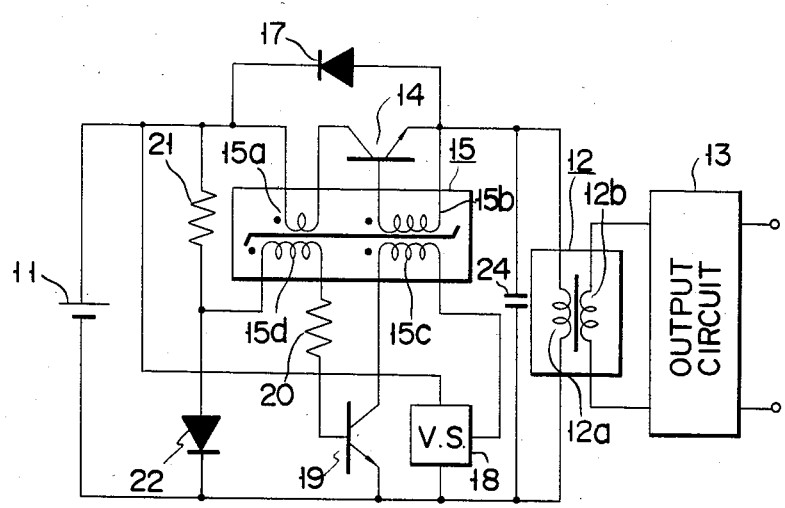
Figure 8:
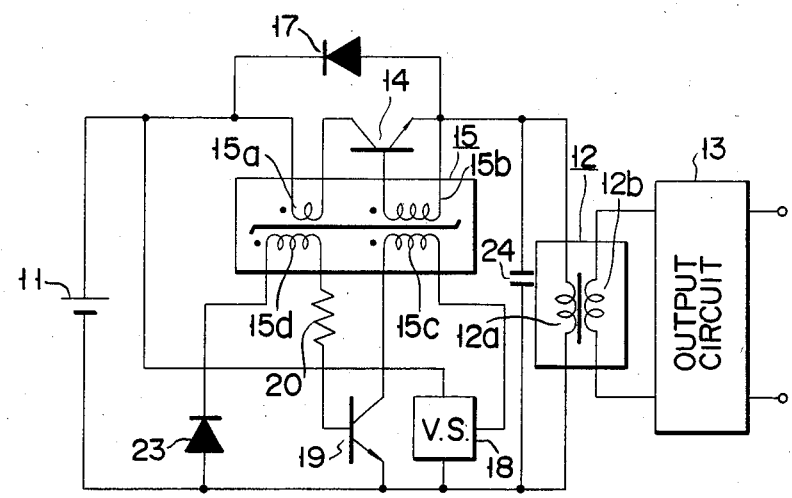

In the third and fourth embodiments, as shown in FIGS. 7 and 8, respectively, the resonance capacitor 16 in FIGS. 3 and 6 is removed and in place of the resonance capacitor 16, a resonance capacitor 24 is connected in parallel to the primary winding 12a of the power transmitting transformer 12. In this case, however, there is a slight difference in that the terminal voltage of the resonance capacitor 24 differs from the terminal voltage of the resonance capacitor 16 or the like; however, the apparatuses operate in a similar manner to those in the first and second embodiments shown in FIGS. 3 and 6.

What is claimed is:

1. A switching power supply comprising:
   a DC power source;
   a power transmitting transformer having primary and secondary windings for transmitting electric power from the primary side to the secondary side;
   rectifying means, connected to the secondary winding of said power transmitting transformer, for transforming an output appearing on the secondary side of said transformer to a direct current;
   a saturable transformer having first to fourth windings, said first winding being inserted in series in a first power supply path from said DC power source to said primary winding of said power transmitting transformer;
   main switching means for opening or closing said first power supply path, said main switching means being inserted in said first power supply path so as to be connected in series to said first winding of said saturable transformer and being controlled by an output of said second winding of said saturable transformer and being provided in a manner such that the saturable transformer acts as a positive feedback system through said first and second windings;

a resonance capacitor which is connected in parallel to a series circuit consisting of said main switching means and said first winding and causes the resonance between an exciting inductance of said power transmitting transformer and said resonance capacitor;

an auxiliary power source for generating a predetermined direct current output to drive said third winding of said saturable transformer by a polarity opposite to that of said first winding; and auxiliary switching means, inserted in series in a second power supply path from said auxiliary power source to said third winding of said saturable transformer, for opening or closing said second power supply path, said auxiliary switching means being controlled by an output of said fourth winding of the saturable transformer and being provided in a manner such that said saturable transformer acts as a positive feedback system through said third and fourth windings.

2. A switching power supply according to claim 1, wherein a diode for the recovery of electric power is connected in parallel to said resonance capacitor.

3. A switching power supply according to claim 1, wherein said main switching means is a transistor.

4. A switching power supply according to claim 1, wherein said auxiliary switching means is a transistor.

5. A switching power supply comprising:
a DC power source;
a power transmitting transformer having primary and secondary windings for transmitting electric power from the primary side to the secondary side;
rectifying means, connected to the secondary winding of said power transmitting transformer, for transforming an output appearing on the secondary side of said transformer to a direct current;
a saturable transformer having first to fourth windings, said first winding being inserted in series in a first power supply path from said DC power source to said primary winding of said power transmitting transformer;

main switching means for opening or closing said first power supply path, said main switching means being inserted in said first power supply path so as to be connected in series to said first winding of said saturable transformer and being controlled by an output of said second winding of said saturable transformer and being provided in a manner such that the saturable transformer acts as a positive feedback system through said first and second windings;

a resonance capacitor which is connected in parallel to the primary winding of said power transmitting transformer and causes the resonance between an exciting inductance of said power transmitting transformer and said resonance capacitor;

an auxiliary power source for generating a predetermined direct current output to drive said third winding of said saturable transformer by a polarity opposite to that of said first winding; and auxiliary switching means, inserted in series in a second power supply path from said auxiliary power source to said third winding of said saturable transformer, for opening or closing said second power supply path, said auxiliary switching means being controlled by an output of said fourth winding of the saturable transformer and being provided in a manner such that said saturable transformer acts as a positive feedback system through said third and fourth windings.

6. A switching power supply according to claim 5, wherein a diode for the recovery of electric power is connected in parallel to a series circuit consisting of said main switching means and said first winding.

7. A switching power supply according to claim 5, wherein said main switching means is a transistor.

8. A switching power supply according to claim 5, wherein said auxiliary switching means is a transistor.

* * * * *